United States Patent
Lim et al.

(10) Patent No.: US 6,544,676 B2
(45) Date of Patent: Apr. 8, 2003

(54) INTERNAL REFORMING MOLTEN CARBONATE FUEL CELL WITH MEMBRANE FOR INTERCEPTING CARBONATE VAPOR

(75) Inventors: Tae Hoon Lim, Seoul (KR); Heung Yong Ha, Seoul (KR); Suk Woo Nam, Seoul (KR); In Hwan Oh, Seoul (KR); Seong Ahn Hong, Seoul (KR); Hyeung Dae Moon, Seoul (KR); Ho In Lee, Seoul (KR)

(73) Assignee: KIST (Korea Institute of Science and Technology, Seoul (KR)

( * ) Notice: Subject to any disclaimer, the term of this patent is extended or adjusted under 35 U.S.C. 154(b) by 137 days.

(21) Appl. No.: 09/761,869

(22) Filed: Jan. 16, 2001

(65) Prior Publication Data

US 2001/0026881 A1 Oct. 4, 2001

(30) Foreign Application Priority Data

Jan. 25, 2000 (KP) .............................. 00-3353

(51) Int. Cl.[7] ................................ H01M 8/18
(52) U.S. Cl. ............................. 429/19; 429/16; 429/34; 429/40; 429/41; 429/44; 429/17
(58) Field of Search .................... 429/16, 19, 34, 429/41, 44, 17, 40

(56) References Cited

U.S. PATENT DOCUMENTS

| | | |
|---|---|---|
| 4,365,007 A | 12/1982 | Maru et al. |
| 4,467,050 A | 8/1984 | Patel et al. |
| 4,702,973 A * | 10/1987 | Marianowski ............... 429/41 |
| 4,774,152 A | 9/1988 | Matsumura et al. |
| 4,788,110 A | 11/1988 | Bernard |

FOREIGN PATENT DOCUMENTS

JP          63-029458      *  2/1988 ............ H01M/8/02

* cited by examiner

Primary Examiner—Patrick Ryan
Assistant Examiner—Angela J Martin
(74) Attorney, Agent, or Firm—Christensen O'Connor Johnson Kindness PLLC (57) ABSTRACT

An internal reforming molten carbonate fuel cell having a membrane for intercepting carbonate vapor and hydrated vapor is disclosed. The intercepting membrane is made from nickel or nickel alloy which has a high electrical conductivity, corrosion resistant property in an anode environment, and a low affinity for the carbonate vapor. Due to the presence of the intercepting membrane, the transfer of the carbonate vapors and hydrated vapors to the internal reforming catalyst is markedly retarded to prolong the catalytic activity. As a result, a longer operating molten carbonate fuel cell can be obtained.

1 Claim, 7 Drawing Sheets

INTERNAL REFORMING MOLTEN CARBONATE FUEL CELL WITH MEMBRANE FOR INTERCEPTING CARBONATE VAPOR

BACKGROUND OF THE INVENTION

1. Field of the Invention

The present invention relates to a molten carbonate fuel cell, and more particularly to a longer lasting and highly efficient internal reforming molten carbonate fuel cell equipped with a membrane for intercepting carbonate vapor.

2. Description of the Related Art

Generally, fuel cells are utilized to directly convert chemical energy stored in chemical compounds such as hydrocarbons into electrical energy. Among many types of fuel cells, molten carbonate fuel cells (MCFC) and solid oxide fuel cells (SOFC), usually operated at 650° C. or above, are classified as high temperature fuel cells. These high temperature fuel cells are advantageous in that a reforming reaction can take place inside the fuel cell stack. Due to its internal reforming characteristic which allows reforming reaction to be carried out without additional external heat exchangers, much of the power plant facilities can be simplified to reduce the manufacturing cost.

However, there is a drawback in that the internal reforming catalyst used for the molten carbonate fuel cells tend to be deactivated by alkaline carbonate vapor evaporated from the electrolyte matrix, hence shortening its life time. Specifically, the internal reforming catalyst looses its catalytic activity when it comes into contact with carbonate vapor generated during the operation of the fuel cell or when it comes into contact with hydrated vapor converted from the reaction of carbonate vapor and steam, which eventually decreases the life time of the fuel cells.

Accordingly, in order to realize the use of the internal reforming molten carbonate fuel cells in practical application, there have been numerous researches related to lengthening the life of internal reforming catalyst in the carbonate fuel cell.

For example, to decrease the amount of carbonate vapor from being in contact with catalyst, U.S. Pat. No. 4,365,007 (Energy Research Corporation) discloses a method of changing the structure of the gas channel within the anode of the fuel cell and a method of inserting a porous corrugated plate inside the anode. Similarly, U.S. Pat. No. 4,467,050 suggests a method of forming an inorganic layer on a stainless steel plate by using an electrophoresis method, followed by dipping the plate in a catalytic slurry to obtain a plate coated with catalyst. Further, U.S. Pat. No. 4,788,110 discloses a method of placing a structure made from a stainless steel between the anode and pellets of catalyst and a method of inserting carbonate vapor absorption pellets between the pellets of catalyst to reduce the catalyst from being in contact with the carbonate vapor.

However, the above disclosed patents do not substantially reduce the carbonate vapors from being introduced to the catalysts. Moreover, the cell performance decreases from the increased internal resistance caused by introduction of absorption pellets made from electrical insulating material.

On the other hand, U.S. Pat. No. 4,774,152 (Mitsubishi Electric Corporation of Japan) discloses a method of coating the surface of catalyst pellets with a porous carbonate absorption material (electrolyte-sink) made substantially from Al, Si and Cr, a method of mixing with catalytic powder, and a method of forming a carbonate vapor absorption layer on top of the catalyst layer.

However, in using such carbonate absorption material to intercept carbonate vapor, the carbonate from the electrolyte matrix tends to dissipate due to the continuous transfer of carbonate to the absorption layer, resulting in the shortening of the life time of the fuel cell. Moreover, there is a further problem in that the inorganic material used for absorbing carbonate vapor increases the internal resistance of the fuel cell.

Although, the above prior art attempts to prevent the poisoning of the internal reforming catalyst from the alkaline carbonate by intercepting the flow of carbonate vapor to the catalyst or by forming a carbonate absorption layer which undesirably depletes the carbonate in the electrolyte matrix to render the fuel cell with decreased life-span, they fall short of providing a satisfactory solution. Hence, the improvement in lengthening the life time of the internal reforming catalyst in the molten carbonate fuel cell still remains to be desired.

SUMMARY OF THE INVENTION

In view of the foregoing, it is an object of the present invention to provide a highly efficient and longer lasting molten carbonate fuel cell having a membrane for intercepting carbonate vapor which significantly reduces the deactivation of the internal reforming catalyst by carbonate vapor.

In order to achieve the above object, the present invention provides an internal reforming molten carbonate fuel cell having an intercepting membrane interdisposed between an anode and catalyst. The present inventors selected nickel or nickel alloy as a base material for the intercepting membrane due to its low affinity for carbonate vapor, high electrical conductivity, and its high corrosion resistance in the anode environment over other metals or metal-oxides. Thus, in the present invention, the intercepting membrane is made of nickel or nickel alloy for intercepting carbonate vapor and/or hydrated vapor converted from the reaction between carbonate vapor and steam and placed in between anode and reforming catalyst to hinder hydrated and carbonate vapors from reaching the catalyst. The intercepting membrane also has a pore size distribution ranging from an average diameter of about 0.01 $\mu$m to about 10 $\mu$m, porosity of about 30% to about 80%, and a thickness of about 0.1 mm to about 1 mm.

BRIEF DESCRIPTION OF THE DRAWINGS

The above objects and other advantages of the present invention will become more apparent by describing in detail experiments thereof with reference to the attached drawings in which.

DETAILED DESCRIPTION OF THE INVENTION

The present invention will now be described in detail below.

According to the present invention, a membrane for intercepting carbonate vapor provided in an internal reforming molten carbonate fuel cell hinders transfer of carbonate vapor and/or hydrated vapor converted from the reaction between carbonate vapor and steam to a reforming catalyst and eventually reduces the amount of carbonate in the reforming catalyst to prolong the life time of the fuel cell.

The intercepting membrane, in addition to intercepting electrolyte vapor, should also have a high degree of electrical conductivity and anti-corrosive properties in the anode environment. Hence, it is preferred that nickel or nickel alloy should be used for the material for the intercepting membrane.

According to the present invention, the intercepting membrane should be gas permeable by having a pore size distribution ranging from an average diameter of about 0.01 $\mu$m to about 10 $\mu$m, porosity of about 30% to about 80%, and a thickness of about 0.1 mm to about 1 mm.

Generally, a nickel or nickel alloy intercepting membrane of the present invention is manufactured by the following method. First, a fine nickel powder and chromium powder to be used for nickel alloy are mixed by ball-mill process. Here, optionally, only nickel powder can be used or a prepared powder containing nickel alloy mixture can be used to obtain the respective nickel or nickel alloy intercepting membranes. Then, the mixed powder is added into a toluene-ethanol solution with a binder such as polyvinyl butylol and a plasticizer such as dibutyl phthalate, followed by a second ball-mill process to obtain a slurry. The slurry is then formed into a plate having a predetermined thickness by using a conventional method such as tape-casting method. Thereafter, the plate is subjected to sintering process at about 600° C. to about 1500° C. in reduction atmosphere to obtain a resulting porous nickel alloy membrane. Here, it is preferable that the thickness of the intercepting membrane should be about 0.1 mm to about 1.0 mm, and the porosity should be about 30% to about 80%.

In the present invention, the intercepting membrane is placed inside of the fuel cell between the anode and the catalyst. Although, the distance between the anode and the intercepting membrane increases with the size of the fuel cell and decreases with increase of the fuel consumption rate, it is preferable that the distance should be about 0.1 mm to about 1.0 mm.

Herein below, the present invention will be described in more detail with reference to the attached drawings.

Figure 1:
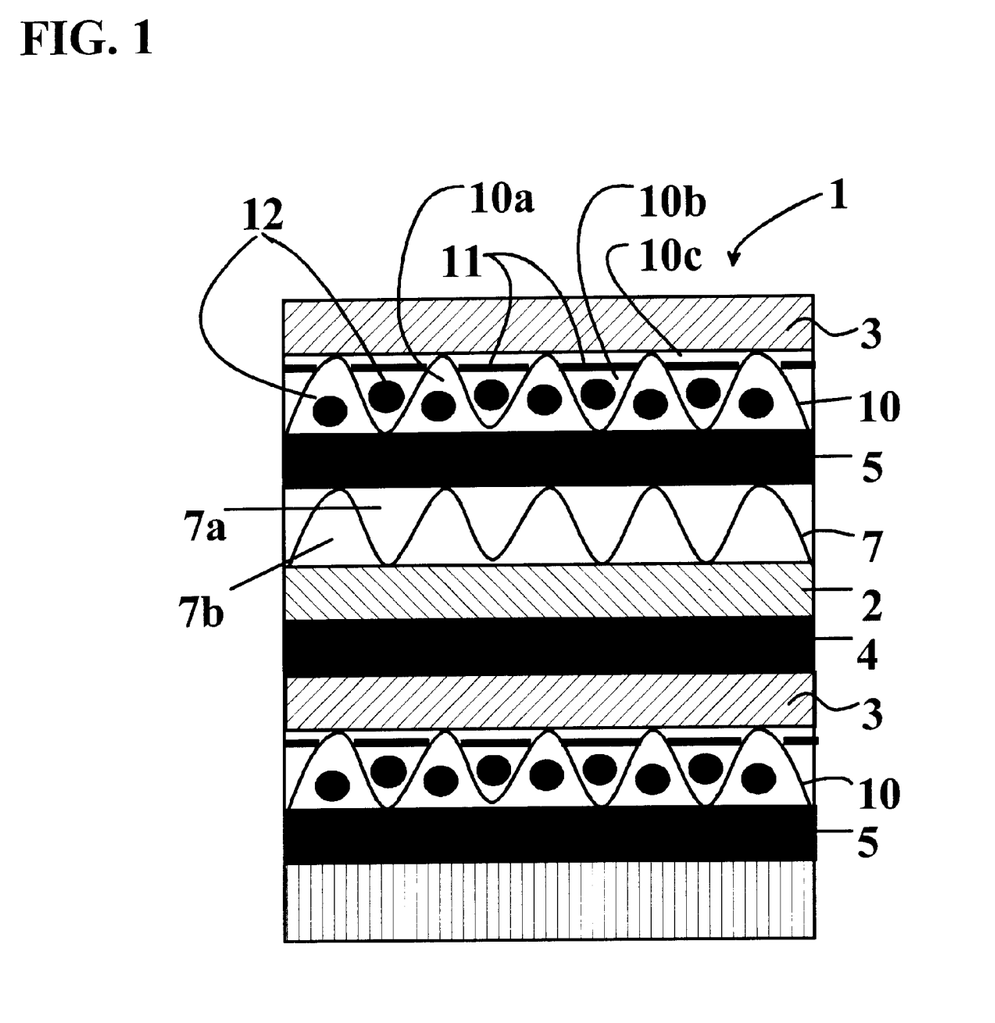
FIG. 1 is a cross-sectional view, which is shown in a perpendicular direction to the flow of gas, illustrating an internal reforming molten carbonate fuel cell having a membrane for intercepting carbonate vapor, according to the present invention.
Figure 2:
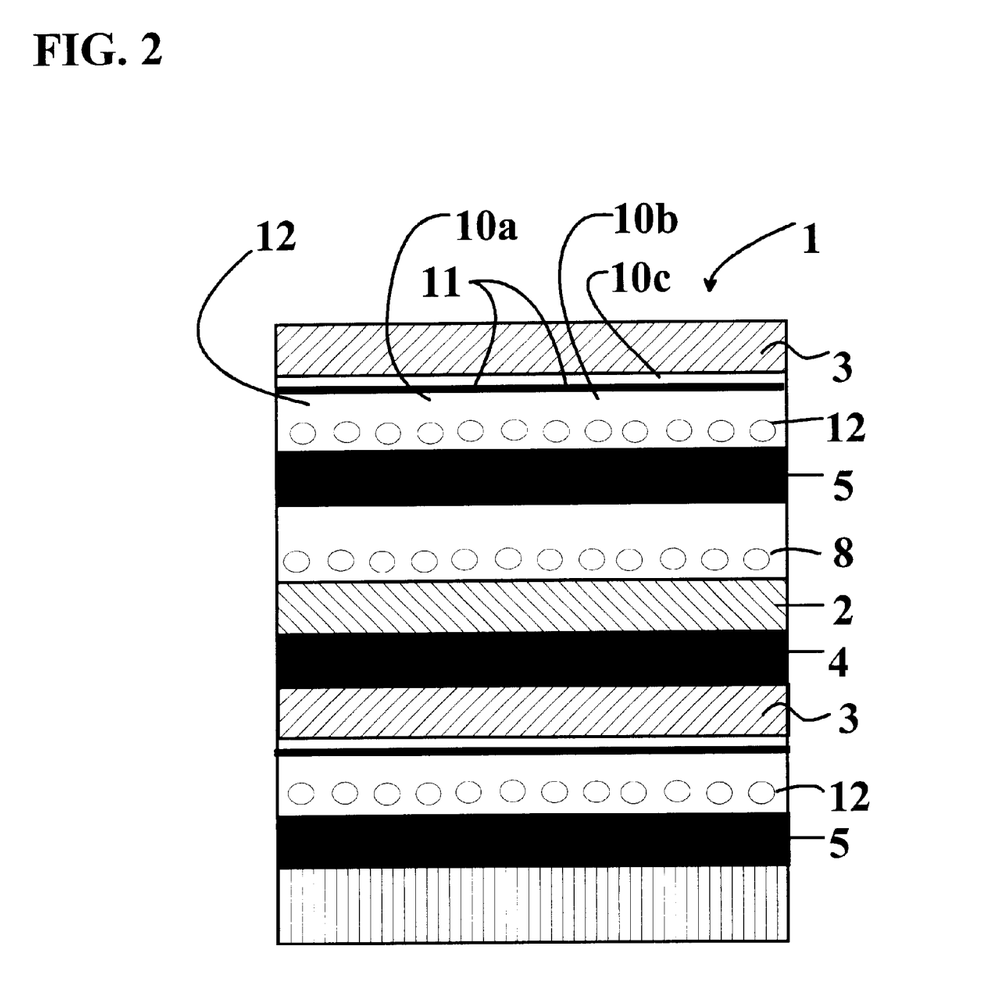
FIG. 2 is a cross-sectional view, which is shown in a parallel direction to the flow of gas, illustrating an internal reforming molten carbonate fuel cell having a membrane for intercepting carbonate vapor, according to the present invention.

FIGS. 1 and 2 are cross-sectional views, which are respectively shown in perpendicular and parallel directions to the flow of gas, illustrating an internal reforming molten carbonate fuel cell having a membrane for intercepting carbonate vapor according to the present invention. Referring to FIG. 1, a fuel cell 1 comprises a cathode 2, an anode 3, and an electrolyte matrix 4 which is disposed between the cathode 2 and the anode 3. A separator 5 functions to separate the gas supplied to cathode 2 and anode 3. A current collector 7, which is located on top of the cathode 2, has spaces 7a and 7b for allowing passage for the gas supplied to the cathode, and has a corrugated structure for distributing gas toward the cathode side. The current collector 7 has perforated holes 8 for allowing gas to freely pass between the spaces 7a and 7b. A current collector 10 which is located below the upper anode 3 has spaces 10a and 10b for allowing passage for the fuel gas containing hydrocarbon supplied to the anode and also has a corrugated structure for distributing gas toward the anode side. A porous intercepting membrane 11 having a gas permeable property is positioned between anode 3 and current collector 10 to form a space 10b which is located between the intercepting membrane 11 and the current collector 10 and a space 10c which is located between the intercepting membrane 11 and the anode 3. Although, the intercepting membrane is permeable to gas, it has complex three-dimensional porous structure with an average pore diameter of about 0.01 $\mu$m to about 10 $\mu$m, which makes it difficult for gases having high surface tension to pass the membrane. Because the intercepting membrane 11 and the current collector 10 are not completely sealed off from each other, there is no pressure difference between the spaces 10b and 10c as the spaces 10a and 10b communicate with each other. The current collector 10 has a plurality of holes 12 which also makes possible for spaces 10a and 10b to communicate with each other to allow gas to freely pass between both spaces.

Figure 3:
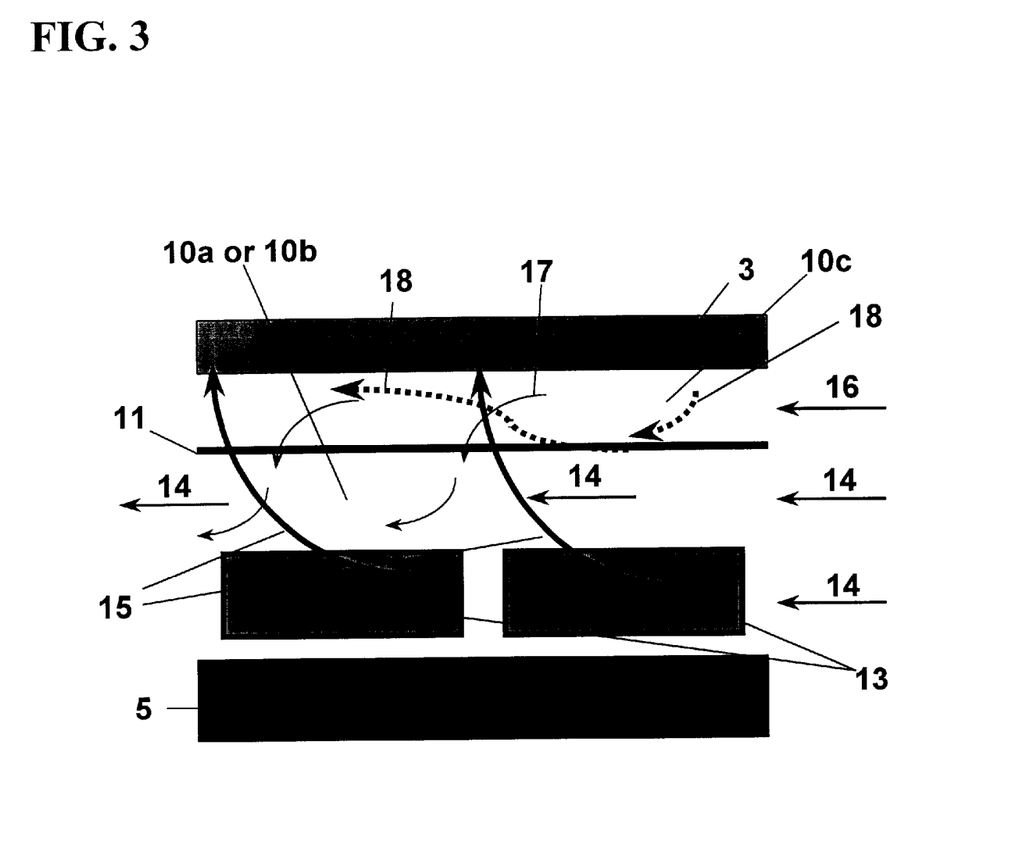
FIG. 3 is a cross-sectional view which illustrates a function of the membrane for intercepting carbonate vapor in the internal reforming molten carbonate fuel cell according to the present invention.

By referring to FIG. 3, the operation of the intercepting membrane 11 in the molten carbonate fuel cell will be explained in detail. An internal reforming catalyst 13 is placed in the spaces 10a and 10b. The fuel gas 14 supplied through the spaces 10a and 10b is reformed to hydrogen and carbon monoxide gas. The reformed gas 15 in the spaces 10a and 10b passes through the intercepting membrane 11 and space 10c to the anode 3 to be consumed by electrochemical reaction. Here, the rate of transfer of hydrogen gas 15 generated in the spaces 10a and 10b to the anode 3 is determined by its concentration difference between the space 10b and space 10c. A fuel gas 16 supplied through the space 10c is transferred to the space 10b by its concentration difference and it is reformed into a gas containing hydrogen and carbon monoxide.

Generally, it has been reported that alkaline carbonate is transferred to the catalyst in the form of a hydrated vapor. However, at the surfaces of the catalyst and other structures, hydrated alkaline vapor reacts with carbon dioxide gas and changes into liquid-phase alkaline carbonate which temporarily condenses on the surface of catalyst or neighboring structures. A nickel or nickel alloy intercepting membrane 11 of the present invention which has a porosity of about 30% to about 80% has a large surface contact angle with the liquid-phase alkaline carbonate. As a result, the intercepting membrane 11 has a low affinity for condensed alkaline carbonate. Due to the low affinity the intercepting membrane 11 has for the condensed alkaline carbonate, the hydrated alkaline vapor 16 cannot pass through the complex three-dimensional pores in the intercepting membrane 11, instead it passes along the space 10c as re-vaporized alkaline vapor 18. Here, in the presence of water vapor in the fuel gas, the condensed alkaline carbonate present on the surface of the intercepting membrane 11 vaporizes as hydrated alkaline vapor 18 and passes along the space 10c to be exhausted. Hence, because only a small portion of alkaline carbonate in the form of hydrated vapor is introduced to the space 10b, alkaline carbonate transferred to the catalyst can be markedly reduced.

EXAMPLES

The following examples are provided to further illustrate the invention and are not intended to limit the scope of the present invention.

Example 1

First, 4 g of methyl cellulose, 54 g of water, 4 g of glycerin and 4 g of SN-Deformer 483 (San Nup Co., Ltd.) were mixed for 24 hours, then the mixture was mixed with 4 g of Cerasperse 5468 (San Nup Co., Ltd.) and 168 g of a powder mixture having 90 weight % of Ni and 10 weight % of Cr for 48 hours, followed by 48 hours of ball-mill process to obtain a slurry. For deaeration, the slurry was mechanically agitated under vacuum utilizing a vacuum pump. Here, the temperature of the slurry was maintained between room temperature and 40° C. Thereafter, by utilizing the conventional tape-casting method, a green sheet was obtained. The green sheet was then dried at room temperature. Binder was removed from the green sheet while gradually increasing the temperature under hydrogen rich reducing environment. It was then subjected to sintering process at 900° C. to finally obtain an intercepting membrane having a porosity of 57% and a thickness of 0.8 mm.

Nickel and nickel-chromium electrodes both having 10 cm (in length and width) were respectively used for cathode and anode for the fuel cell. For electrolyte, a carbonate mixture having $Li_2CO_3$ and $K_2CO_3$ was utilized, and to lower the melting point of the carbonate mixture, the weight ratio of $Li_2CO_3$ and $K_2CO_3$ was adjusted to 68% and 32%, respectively. The fuel cell was obtained by stacking, in the order of, a stainless anode body, an anode current collector, an anode, an electrolyte matrix, a carbonate electrolyte, an electrolyte matrix, a cathode, a cathode current collector, and a stainless cathode body. The catalyst was placed in a gas passage located between the anode body and the anode current collector, and the intercepting membrane obtained from the above was installed between the catalyst and the anode current collector. An Ni/MgO catalyst having 29 weight % of Ni was used for the catalyst in an amount of 20 g of cylindrical pellets having a rise diameter of 1.2 mm and a height of 1.7 mm. For the reference cell, the fuel cell having the same structure as the above, except for the missing intercepting membrane, was utilized. During the operation of the fuel cell and the reference cell, internal reforming conversion of methane and selectivity of hydrogen ($H_2/CH_4$) were analyzed periodically and shown in FIG. 4. Methane was supplied at a rate of 100 ml/min and a steam to carbon ratio was about 3, while reaction temperatures was maintained at 650° C. The distance between the anode and the intercepting membrane was set at 0.55 mm.

Figure 4:
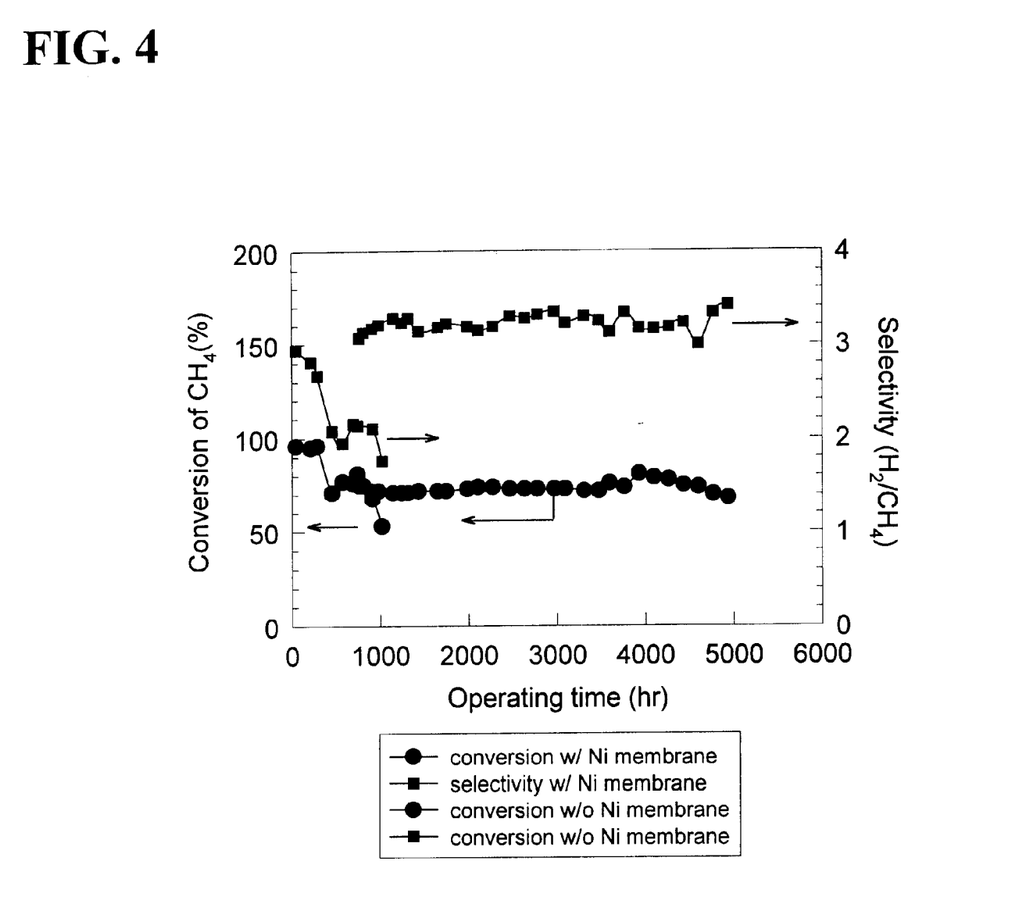
FIG. 4 is a graph which shows the difference in the catalytic activities of a respective catalyst in a fuel cell with a membrane for intercepting carbonate vapor and in a conventional fuel cell.

As it can be seen from FIG. 4, the reference cell (without the intercepting membrane) showed a 90% of methane conversion and 2.9 of selectivity for hydrogen at the beginning of its operation, but after 1000 hours it showed less than 50% of methane conversion and 1.9 of selectivity for hydrogen, which caused the difficulty in maintaining the normal operation of the reference cell. In contrast, the fuel cell equipped with the intercepting membrane maintained its initial 70% of methane conversion and 3.0 of selectivity for hydrogen upto 5000 hours of its operation, and it was determined that the deactivation of the catalyst by the alkaline carbonate was markedly reduced by having the intercepting membrane in the fuel cell.

Example 2

A molten carbonate fuel cell and an intercepting membrane having a porosity of 55% and a thickness of 0.7 mm were prepared by the steps described for Example 1.

Figure 5:
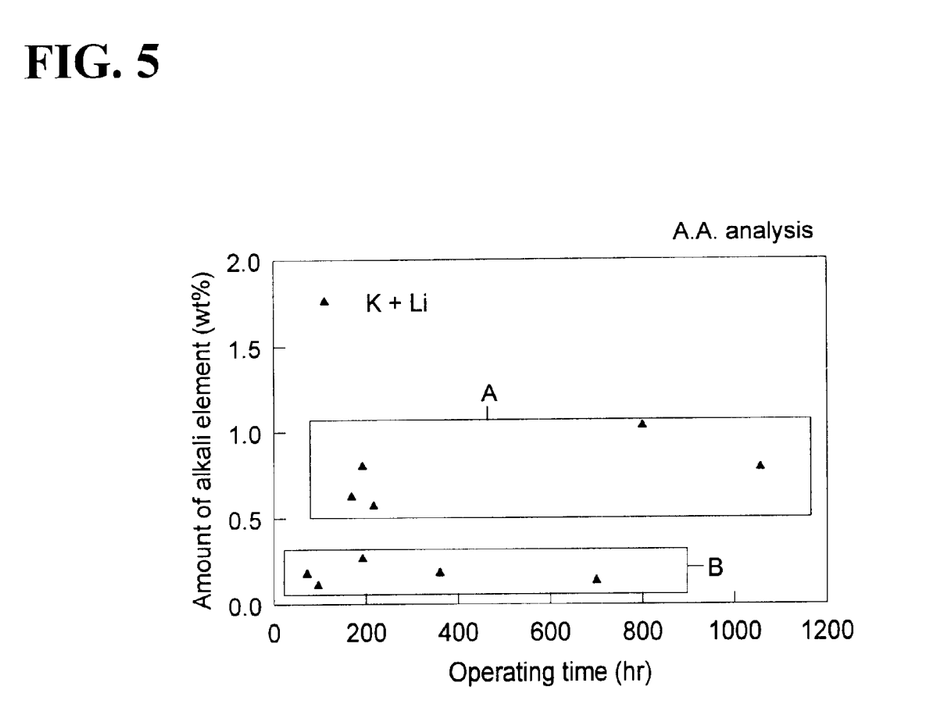
FIG. 5 is a graph which shows an amount of carbonate vapor transferred toward catalyst in a conventional fuel cell (A) and in a fuel cell (B) with a membrane for intercepting carbonate vapor.

The amount of alkaline substance, K and Li, transferred to the internal reforming catalyst in both the fuel cells and the reference cell was measured and shown by FIG. 5. The operating conditions of the fuel cell and the reference cell were same as those outlined in Example 1. After the completion of numerous operations, each having a different operating time, for both the fuel cell and the reference cell, the amount of K and Li in the internal reforming catalyst was respectively analyzed by utilizing atomic absorption. In FIG. 5, the total amount of alkaline (K and Li) found in the catalyst from the reference cell is represented by 'A', and the total amount of alkaline (K and Li) found in the catalyst from the fuel cell is represented by 'B'. Irregardless of the operating time, the amount of alkaline found in the catalyst from the fuel cell was less than the amount found in the catalyst from the reference cell, as the amount of alkaline found in 'B' was between 0.10 weight % to 0.25 weight % and the amount of alkaline found in 'A' was between 0.50 weight % to 1.00 weight %. As a result, it was determined that the intercepting membrane drastically reduces the alkaline from transferring to the internal reforming catalyst.

Example 3

A molten carbonate fuel cell and an intercepting membrane having a porosity of 51% and a thickness of 0.3 mm were prepared by the steps described for Example 1. Nickel and nickel-chromium electrodes both having 30 cm (in length and width) were respectively utilized as a cathode and anode of the fuel cell. The intercepting membrane was made from a nickel alloy having 93 weight % of Ni and 7 weight % of Cr, and the distance between the anode and the intercepting membrane was set at 1.0 mm.

Figure 6:
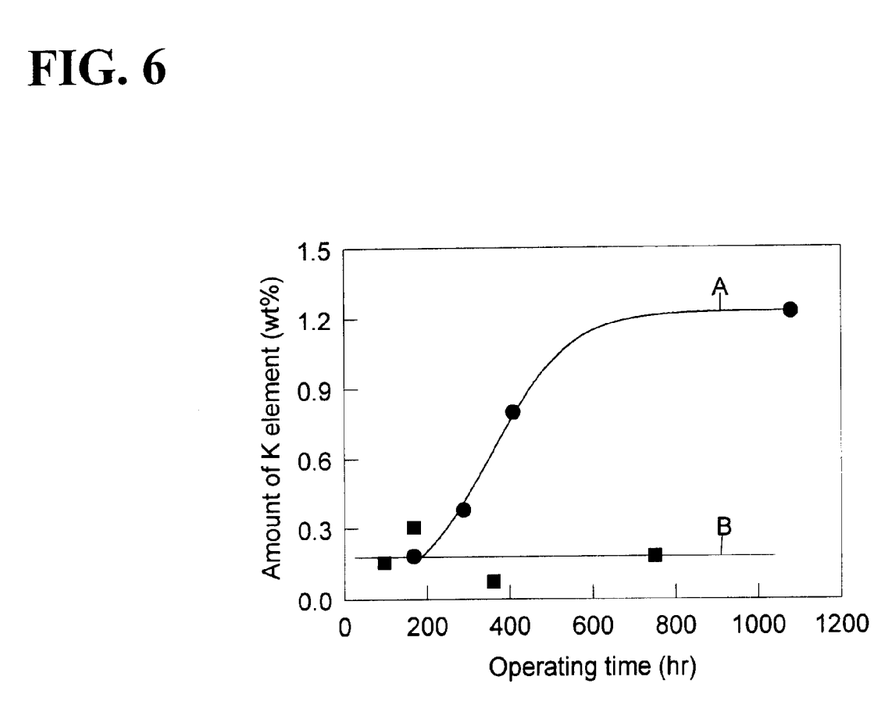
FIG. 6 is a graph which shows an amount of carbonate vapor transferred to the center of catalyst pellets in a conventional fuel cell (A) and in a fuel cell (B) with a membrane for intercepting carbonate vapor.

The amount of potassium K transferred to the center of the internal reforming catalyst in a shape of a cylindrical pellet in both the fuel cell and the reference cell was measured and shown in FIG. 6. The operating conditions of the fuel cell and the reference cell were same as those outlined in Example 1. As shown by FIG. 6, the amount of K found at the center of the internal reforming catalyst from the reference cell which is represented by 'A' increased rapidly with the operating time and reached a plateau after 600 hours. It then uniformly distributed throughout the catalyst after 800 hours of operation. On the other hand, the amount of K found at the center of the catalyst from the fuel cell which is represented by 'B' was drastically less than 'A' due to the effect of the intercepting membrane, and the distribution of K in the catalyst was uniform from the beginning to the end of operation.

Example 4

A molten carbonate fuel cell and an intercepting membrane having a porosity of 58% and a thickness of 0.5 mm were prepared by the steps described for Example 1. The intercepting membrane was made from a nickel alloy having 85 weight % of Ni and 15 weight % of Cr, and the distance between the anode and the intercepting membrane was set at 0.5 mm. For an electrolyte, a mixture of $Li_2CO_3$ and $K_2CO_3$ in a mole ratio of 7:3 was utilized.

Figure 7:
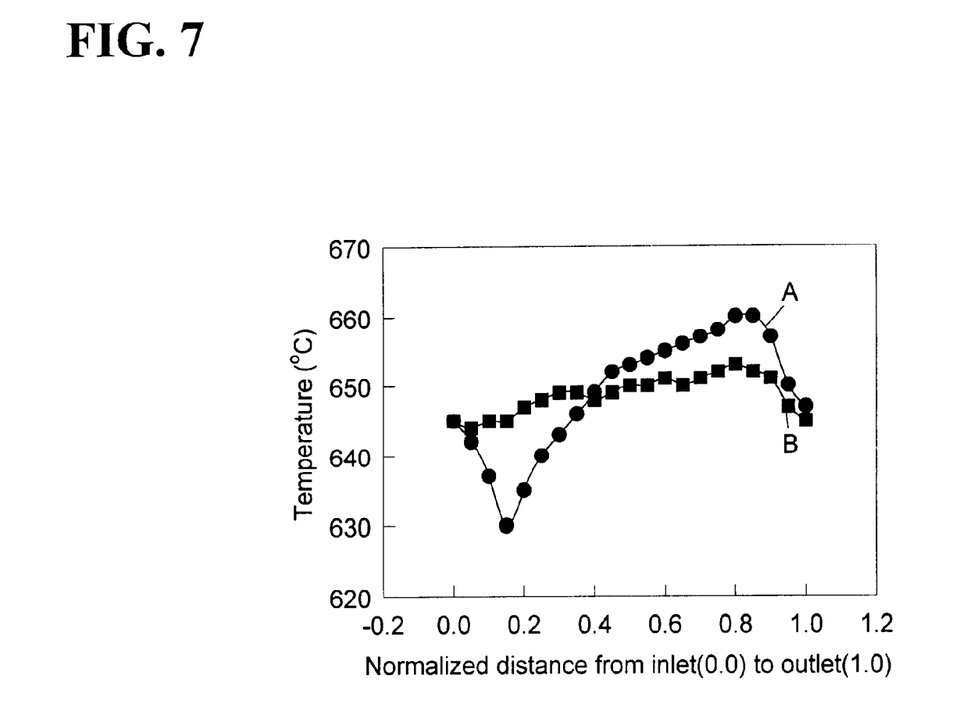
FIG. 7 is a graph which shows a profile of temperature distribution in a conventional fuel cell (A) and in a fuel cell (B) with a membrane for intercepting carbonate vapor.

The fuel cell and the reference cell were operated at 650° C. with a current density of 150 mA/cm$^2$. The temperature distribution in both the fuel cell and the reference cell was measured and shown in FIG. 7. As shown by FIG. 7, the temperature in the reference cell which is represented by 'A' was measured 630° C. near the entrance (indicated by distance 0.2) by an aggressive reforming reaction (endothermic reaction), while the temperature toward the outlet (distance 1.0) increased dramatically by an electrochemical reaction (exothermic reaction) of hydrogen to cause an uneven temperature distribution in the reference cell. However, the temperature in the fuel cell which is represented by 'B' was uniform throughout, attributed by the presence of the intercepting membrane which evenly distributed most of the reactants to all regions in the fuel cell to allow the reforming reaction and the electrochemical reaction to occur evenly throughout the fuel cell.

According to the present invention, because the carbonate vapor and hydrated vapor S transferred to the internal reforming catalyst can be significantly reduced by the presence of the intercepting membrane, the deactivation of the internal reforming catalyst by alkaline carbonate can be markedly delayed. Consequently, the internal reforming molten carbonate fuel cells can be operated for an extended period of time without compromising its performance.

Hence, the present invention provides an effective means for operating molten carbonate fuel cells for a longer duration with increased efficiency, resulting in a decrease of the manufacturing cost of the molten carbonate fuel cells and the cost of power production.

While the present invention has been particularly shown and described with reference to particular examples thereof, it will be understood by those skilled in the art that various changes in form and details may be effected therein without departing from the spirit and scope of the invention as defined by the appended claims.

What is claimed is:

1. An internal reforming molten carbonate fuel cell having a membrane made from nickel or nickel alloy for intercepting carbonate vapor and/or hydrated vapor converted from the reaction between carbonate vapor and steam to delay the deactivation of an internal reforming catalyst, the intercepting membrane having a pore size distribution ranging from an average diameter of about 0.01 $\mu$m to about 10 $\mu$m, a porosity of about 30% to about 80%, and a thickness of about 0.1 mm to about 1 mm.

* * * * *

UNITED STATES PATENT AND TRADEMARK OFFICE
CERTIFICATE OF CORRECTION

PATENT NO. : 6,544,676 B2  Page 1 of 1
DATED : April 8, 2003
INVENTOR(S) : T.H. Lim et al.

It is certified that error appears in the above-identified patent and that said Letters Patent is hereby corrected as shown below:

<u>Title page,</u>
Item [73], Assignee, "KIST (Korea Institute of Science and Technology," should read -- KIST (Korea Institute of Science and Technology), --
Item [30], Foreign Application Priority Data, "00-3353" should read -- 10-2000-3353 --
*Assistant Examiner*, "Angela J Martin" should read -- Angela J. Martin --

Signed and Sealed this

Twenty-first Day of October, 2003

JAMES E. ROGAN
*Director of the United States Patent and Trademark Office*